US008202165B2

(12) United States Patent
Duhamel

(10) Patent No.: US 8,202,165 B2
(45) Date of Patent: Jun. 19, 2012

(54) METHOD AND SYSTEM FOR PROVIDING ASYNCHRONOUS TOURNAMENT PARTICIPATIONS

(75) Inventor: Gérald Duhamel, Drummondville (CA)

(73) Assignee: Labtronix Concept inc., Drummondville, QC (CA)

( * ) Notice: Subject to any disclaimer, the term of this patent is extended or adjusted under 35 U.S.C. 154(b) by 1550 days.

(21) Appl. No.: 11/191,905

(22) Filed: Jul. 29, 2005

(65) Prior Publication Data

US 2006/0030959 A1 Feb. 9, 2006

Related U.S. Application Data

(60) Provisional application No. 60/599,024, filed on Aug. 6, 2004.

(51) Int. Cl.
*G06F 19/00* (2011.01)

(52) U.S. Cl. ................................ 463/42; 463/16; 700/91

(58) Field of Classification Search .............. 463/40–42, 463/16, 22; 700/91–93
See application file for complete search history.

(56) References Cited

U.S. PATENT DOCUMENTS 5,083,271 A 1/1992 Thacher
5,755,621 A * 5/1998 Marks et al. .................... 463/42
5,762,522 A 6/1998 Robinson
5,779,549 A 7/1998 Walker
5,917,725 A 6/1999 Thacher
6,082,887 A 7/2000 Feuer
6,287,202 B1 * 9/2001 Pascal et al. .................... 463/42
6,293,865 B1 9/2001 Kelly
6,817,948 B2 11/2004 Pascal
7,097,562 B2 8/2006 Gagner
2002/0124134 A1 9/2002 Chilton
2003/0060264 A1 * 3/2003 Chilton et al. .................. 463/20
2003/0109306 A1 * 6/2003 Karmarkar ...................... 463/40
2004/0033831 A1 2/2004 Tarantino
2004/0106448 A1 6/2004 Gauselmann
2004/0225387 A1 11/2004 Smith
2004/0229700 A1 * 11/2004 Cannon et al. ................. 463/42
2004/0259620 A1 12/2004 Roy
2005/0020340 A1 1/2005 Cannon
2005/0020352 A1 1/2005 Chilton
2005/0043088 A1 2/2005 Nguyen
2005/0043089 A1 2/2005 Nguyen
2005/0071024 A1 3/2005 Henshaw
2005/0181856 A1 8/2005 Cannon (Continued)

FOREIGN PATENT DOCUMENTS

CA 2340562 8/2002

(Continued)

*Primary Examiner* — Dmitry Suhol
*Assistant Examiner* — Alex F. R. P. Rada, II
(74) *Attorney, Agent, or Firm* — Benoît & Côté

(57) ABSTRACT

A tournament feature is herein disclosed. This tournament feature allows asynchronous participations in which, upon or after the tournament feature ending, scores resulting from participations are evaluated to determine a winner to be awarded a prize. In an embodiment, a method of providing the tournament feature comprises conducting a wagering game on a gaming machine; monitoring activity on the gaming machine; generating a tournament participation invitation based on said activity monitoring; detecting the invitation on the gaming machine; providing a tournament participation on the gaming machine, comprising conducting a tournament play sequence depending on which a tournament score is obtained; storing the score with a plurality of scores throughout conduct of the tournament feature; evaluating stored scores after the end of the tournament feature to determine a winning score; and awarding a prize to the player who entered the winning score.

55 Claims, 7 Drawing Sheets

U.S. PATENT DOCUMENTS

| | | | |
|---|---|---|---|
| 2005/0208989 | A1 | 9/2005 | Kane |
| 2005/0250571 | A1 | 11/2005 | Kane |
| 2006/0014584 | A1 | 1/2006 | Lida |
| 2006/0025197 | A1 | 2/2006 | Kane |
| 2006/0082056 | A1 | 4/2006 | Kane |

FOREIGN PATENT DOCUMENTS

| | | |
|---|---|---|
| WO | 0133478 | 5/2001 |
| WO | WO- 01/33478 | 5/2001 |

* cited by examiner

| | |
|---|---|
| . . . | . . . |
| 126. - 1253 points | ID. 3B4601 |
| 127. - 1146 points | ID. F3346A |
| 128. - 1233 points | ID. 566689 |
| 129. - 1099 points | ID. - none - |
| . . . | . . . |

METHOD AND SYSTEM FOR PROVIDING ASYNCHRONOUS TOURNAMENT PARTICIPATIONS

CROSS-REFERENCE TO RELATED APPLICATIONS

This application claims priority under 35USC§119(e) of U.S. provisional patent application 60/599,024, filed Aug. 6, 2004, the specification of which is hereby incorporated by reference.

TECHNICAL FIELD

The invention relates to a method and system for providing a tournament feature.

BACKGROUND OF THE INVENTION

The field of casino-style games and gaming machines is in constant evolution. Players are always demanding new characteristics or new applications of these characteristics that may provide them novel excitement. While the variety of games has increased, players and game designers are still craving for novelty.

Accordingly, improvements in this field are desired.

SUMMARY OF THE INVENTION

One embodiment of the invention may be described as a method of providing a tournament feature allowing synchronous tournament participations in which, upon or after ending of the conduct of the tournament feature, scores resulting from participations are evaluated to establish a winning score. The player who obtained the winning score is awarded a prize. The method comprises conducting a primary game. It further comprises to provide a participation in the tournament feature upon detection of a feature invitation. The participation comprises the conduct of a tournament play sequence resulting in a score.

In another embodiment, a gaming machine is adapted to provide participations in a tournament feature. The gaming machine comprises displaying means, accepting means, inputting means, awarding means and storing means. The gaming machine further comprises controlling means responsible for conducting a wagering primary game and for providing tournament participations upon detection of invitations. The participations comprise conducting tournament play sequences resulting in scores stored as participations in the tournament feature.

As another embodiment of the invention, a description of a method of providing a tournament feature allowing asynchronous tournament participations is provided. The tournament feature results in a winner being awarded a prize based on scores resulting from participations in the tournament feature. The method comprises storing scores obtained on gaming machines conducting a wagering primary game and providing tournament participations upon detection of invitations. Tournament participations comprise conducting tournament play sequences each resulting in a score. The method further comprises to determine a winner based on the tournament participation scores upon or after the end of the tournament feature.

Another embodiment of the invention is a tournament server adapted for a tournament feature wherein asynchronous participations are allowed. The tournament server comprises communication means exchanging data with gaming machines adapted to provide participations in the tournament feature upon detection of an invitation; storing means for storing scores resulting from participation in the tournament feature; and controlling means controlling the server-related processes related to conduct of the tournament feature comprising the determination of a tournament feature winner.

Another embodiment of the invention may be described as a method of providing a tournament feature allowing asynchronous participations. The method comprises conducting a wagering primary game on a gaming machine; monitoring activity on the gaming machine; and generating a tournament invitation based on activity monitoring. The method further comprises detecting invitations; providing participations in the tournament feature resulting in scores, storing these scores throughout the tournament feature conduct; determining a winner when the tournament feature ends based on the stored scores; and awarding a prize to the winner.

Yet, an embodiment of the invention may be described as computer codes, suitably stored or carried, that are adapted to provide a tournament feature allowing asynchronous participations and resulting in a winner being awarded a prize based on participations. The computer codes are adapted for at least one of:

- conducting a wagering primary game; detecting tournament participation invitations; and providing participations, comprising conducting tournament play sequences resulting in scores;
- storing stores obtained on a gaming machine conducting a wagering game and tournament participations upon detection of tournament invitations, wherein the stores result from the tournament participations; and determining a winner in the tournament feature based on the stored scores at the end of the tournament feature; and
- generating tournament participation invitations resulting in players on gaming machines being provided tournament participations, wherein the participation invitations are based on activity monitored on the gaming machines.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

Lexicon

In this specification, the terms "game outcome" mean "the result of a play of a game, which is evaluated in comparison with criteria to determine an outcome value". Examples of such game outcomes comprise a card combination resulting from a poker game play, or the game indicia displayed once the reels stopped in a line game.

The term "invitation" means "a tournament feature participation offer". This invitation may either or not be refused, and is usually provided as a signal or a state change.

The terms "eligible" or "eligibility" mean "a state in which something or someone is qualified to be chosen". Thus, in an embodiment of the invention only eligible gaming machines may initiate tournament participations.

The term "asynchronous" means "capable of being non-concurrent" or "being not strictly synchronous". Accordingly, an asynchronous participation in the present tournament feature may or may not take place at the same time, but however it can take place at different times.

The term "activity" means either one of "the state of being active" and "the different functions that may be operated". Therefore, gaming machine activity would comprise for instance the gaming machine being operated by a player, the credit information received in the gaming machine, the amount played, and the outcomes occurring on the gaming machine.

The term "identifier" means "some method, means or information suitable for associating someone to something in an individual manner". The method or information used may take many formats, for instance data format, an electronic format, or a physical format.

The term "handicap" for its part means "an advantage given or a disadvantage imposed". Handicaps are assigned to tournament participations. These handicaps may take many forms as described below.

DETAILED DESCRIPTION OF THE INVENTION

Figure 1:
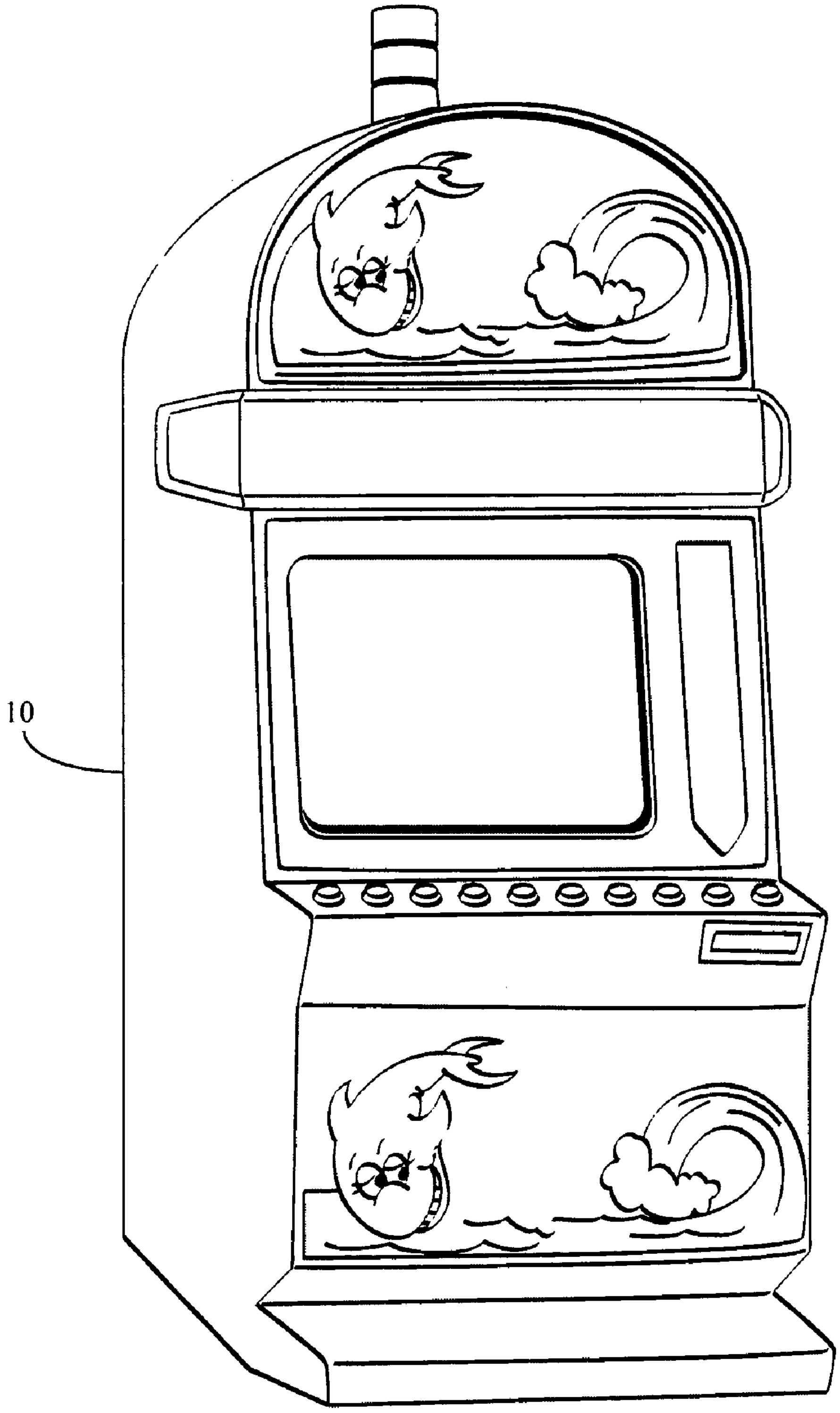
FIG. 1 is a schematic diagram showing a perspective view of a gaming machine suitable for the present invention.
Figure 2:
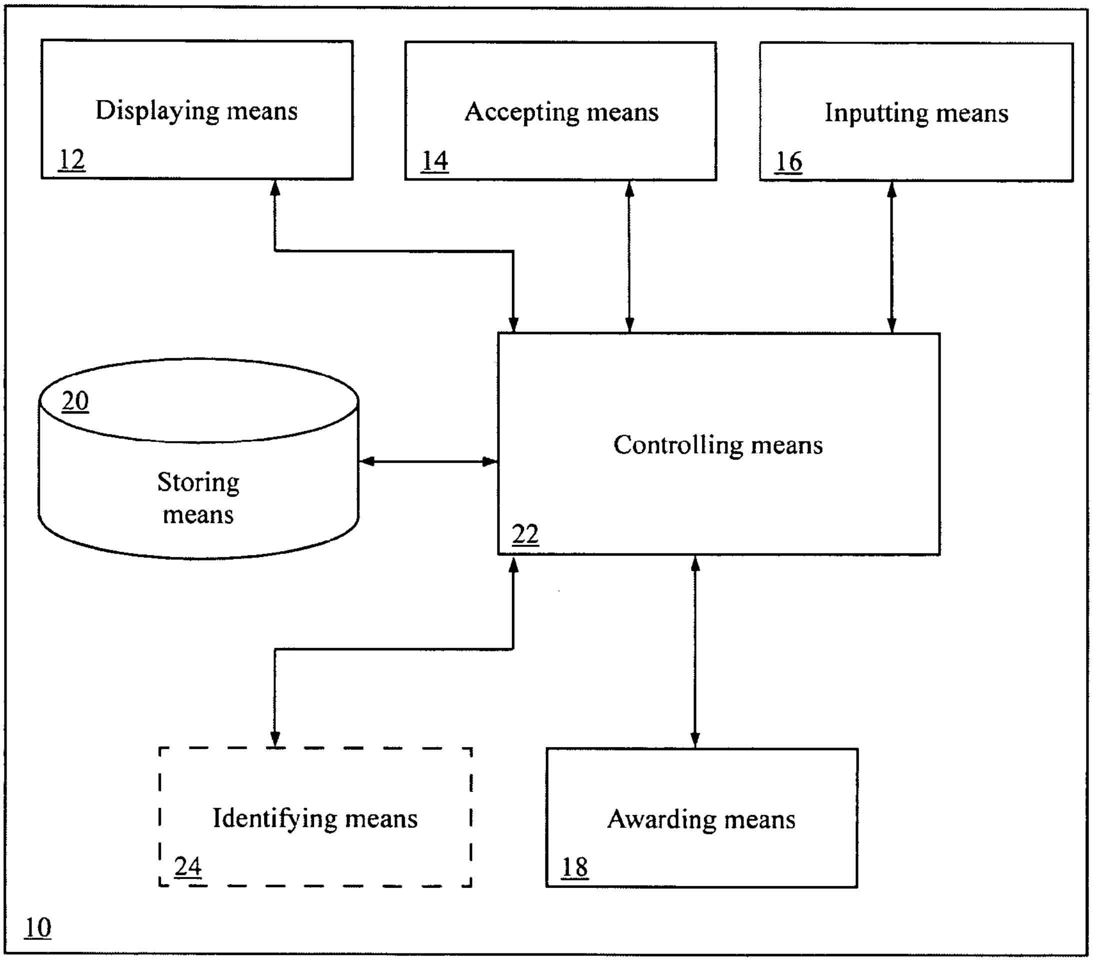
FIG. 2 is a block diagram illustrating components of the gaming machine of FIG. 1.

An embodiment of the present invention is carried out on a gaming machine, as illustrated on FIGS. 1 and 2. The gaming machine 10 comprises displaying means 12, such as a video screen, a LCD screen or mechanical reels; accepting means 14, such as a card reader, or a coin and/or bill acceptor; inputting means 16, such as buttons, levers or a touch screen; awarding means 18, such as a ticket printer, a card reader or a hopper; storing means 20, such as RAM, flash memory, a hard drive or a removable memory medium; and controlling means 22, such as a computer, computer codes, or a hardware controller. The gaming machine 10 further comprises, depending on the embodiments, identifying means 24, such as smart card, voucher printer, and computer codes.

Figure 3:
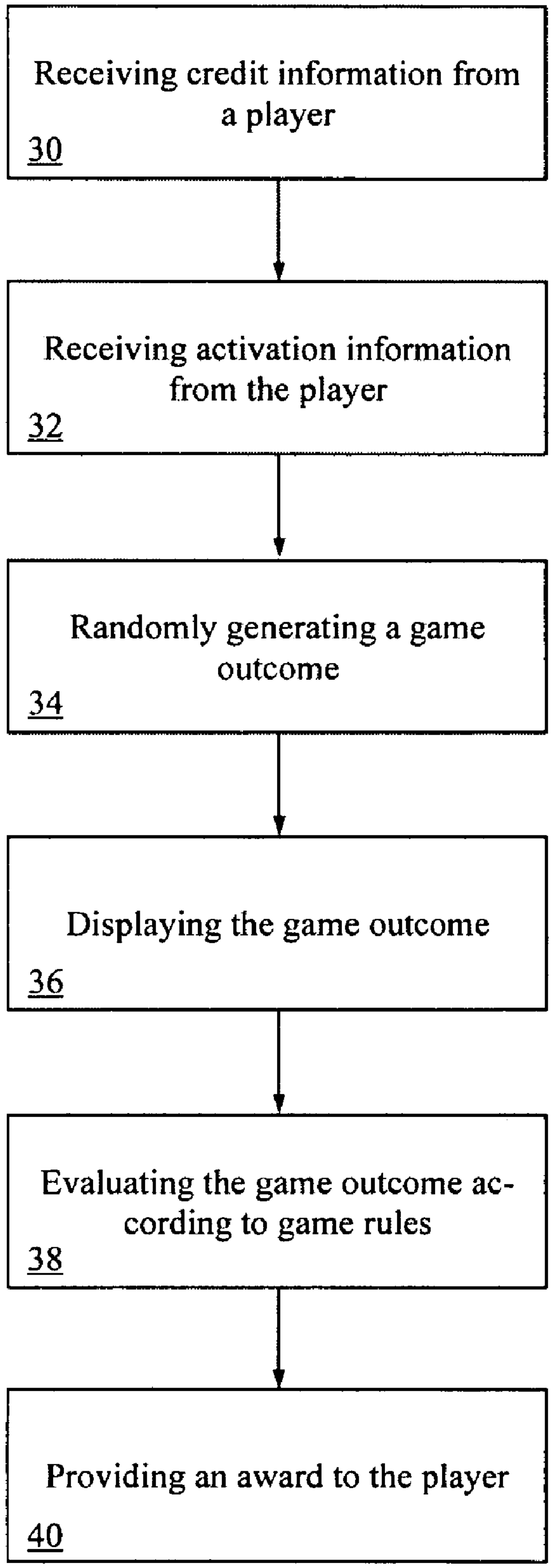
FIG. 3 is a flowchart illustrating the steps performed to provide a primary game on the gaming machine of FIGS. 1 and 2.

Such gaming machine 10 is designed, as shown on FIG. 3, to receive credit information from a player (step 30) either in a physical format (such as coins or bills) or in an electronic format (such as a player card or a money transfer from a bank account), to receive activation information from the player (step 32), to randomly generate (step 34) and display (step 36) a game outcome, to evaluate said game outcome according to game rules (e.g. a pay table) (step 38), and to award a prize to the player for a winning game outcome (step 40).

Figure 4:
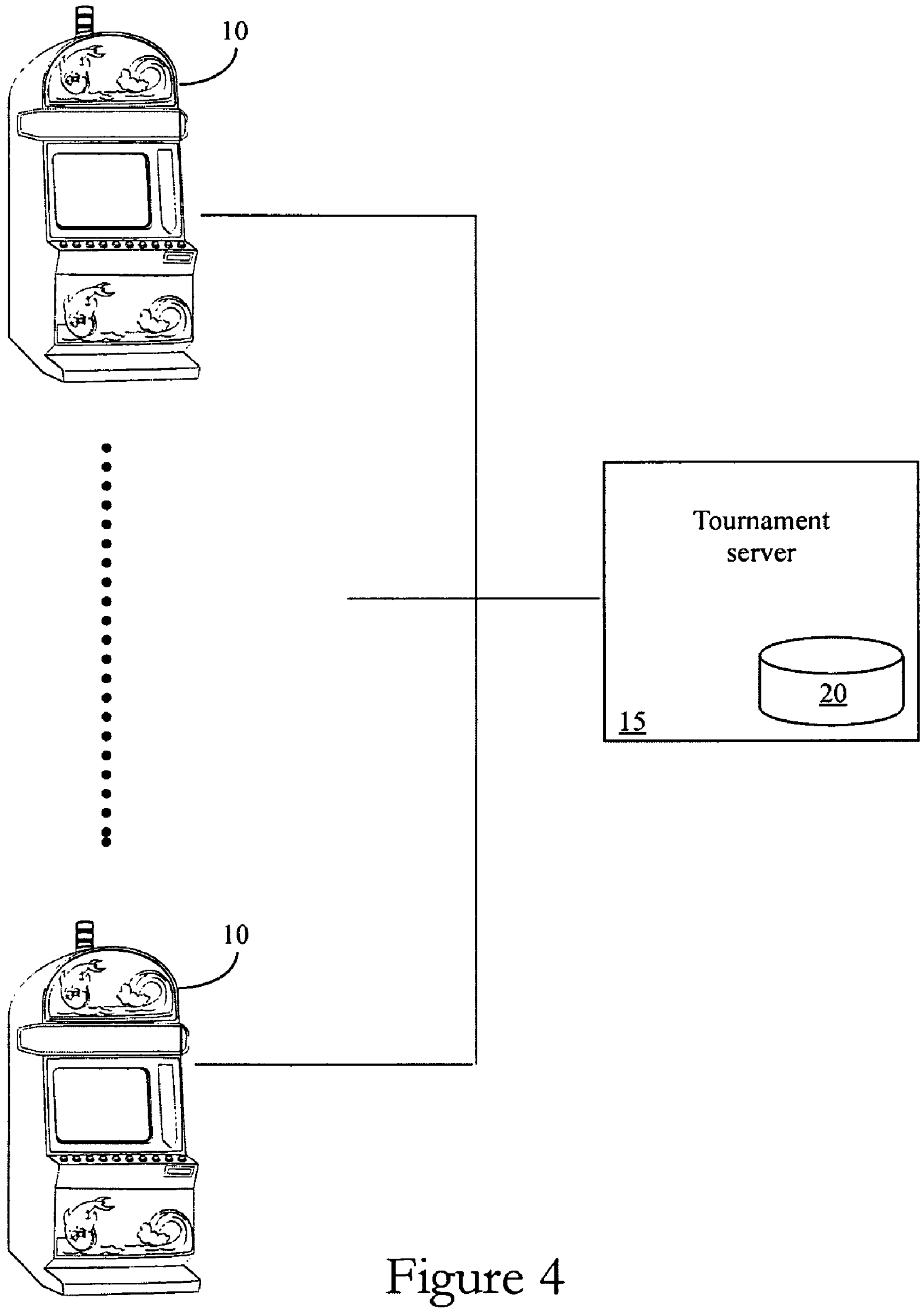
FIG. 4 is a schematic illustration of a network of gaming machines suitable to provide a tournament feature according to one embodiment of the present invention.

Two non-limiting architectures are suitable for embodiments of the present tournament feature: stand-alone gaming machines (illustrated on FIG. 1) and networked gaming machines (illustrated on FIG. 4). The first architecture includes as stated above storing means 20 in the gaming machine 10 in which dynamic data regarding the tournament feature are stored and continually updated. The second architecture (FIG. 4) involves a tournament server 15 communicatively linked with gaming machines 10 offering the tournament feature and also including storing means 20 storing and continually updating data in regard with the present tournament feature. Although these two architectures are physically different, similar functions are performed by components of both architectures with a result of a tournament feature being available on both architectures and respecting the scope of the present tournament feature. Furthermore, the network in one of these architectures may comprise one or more local area networks and even the Internet, suitably managed to provide an embodiment of the tournament feature.

In embodiments of the invention, an asynchronous tournament feature allowing players to asynchronously participate in a tournament feature upon processing of a tournament participation invitation is illustrated. These participations continuously take place until the end of the tournament feature. Upon detection of the end of the feature, an evaluation of scores resulting from these tournament participations is performed in order to determine winning participations and associated awards.

Figure 5:
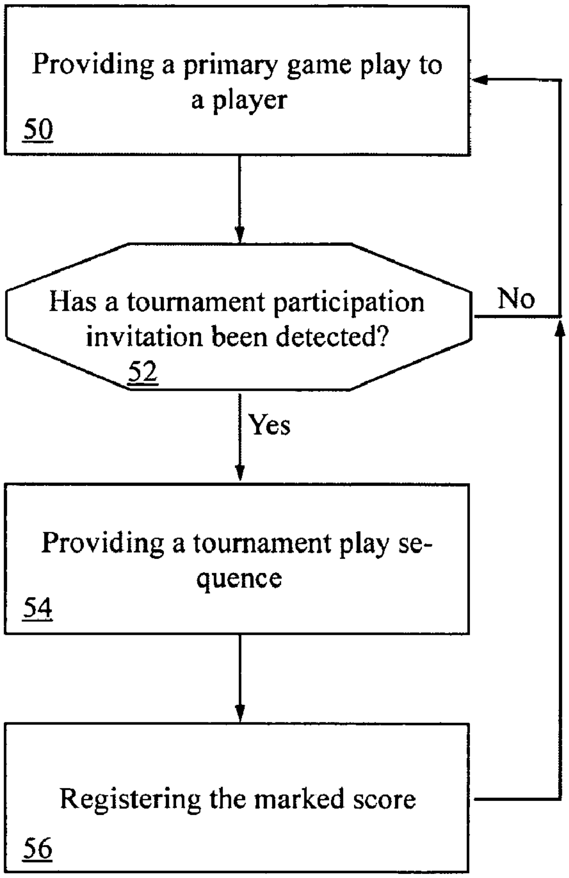
FIG. 5 is a flow chart illustrating steps performed by a gaming machine in an embodiment of the present tournament feature.

FIG. 5 illustrates the steps being performed by a gaming machine providing an asynchronous tournament feature. The steps include providing to a player a play of a primary game to its outcome (step 50), the detection of a tournament participation invitation (step 52), with a negative detection of said invitation resulting in the gaming machine being ready to conduct the primary game (step 50). Upon positive detection of an invitation, a tournament play sequence is initiated and played (step 54) with a score being obtained along the play. When the tournament play sequence ends, the score is registered (storing) (step 56), which can be performed either by the gaming machine or the tournament server either or not in association with a player identifier according to embodiments, followed with the gaming machine returning to its original state (ready to conduct the primary game, thus to perform step 50).

Such embodiments include a gaming machine on which is played a poker game as a primary game. Upon detection of a tournament participation invitation, the player may participate in an asynchronous tournament feature either or not in exchange with a participation fee. In one embodiment, participation is determined by an outside feature, such a monitoring feature and/or random-based feature, determining which of the gaming machines may participate in the tournament feature and when this participation may take place. Determination of eligible gaming machines and non-eligible gaming machines that may or may not participate in the tournament feature may also be performed, the eligibility being determined based on current gaming information, player information, or independently from this information. In another embodiment, participation in the tournament feature is triggered by the occurrence of a particular outcome in the primary game. In a third embodiment, the participation is triggered by the gaming machine independently from any outcome. Depending on the embodiments, any data can be used to determine eligibility for the tournament feature and participation in said feature; for instance game data, cumulative game data, random data, data depending on multiple gaming machines, and a combination of the above. When determination is based on combination of elements, these elements may necessitate concurrent occurrence, or may occur according to predetermined criteria such as within a preset delay (for instance the first event determining a positive eligibility state with the second one triggering the generation of a tournament feature invitation when occurring during a predetermined delay during which the eligibility state remains positive). The selection of the participation- and/or eligibility-deterministic data and the associated criteria is a question of which incentive is to be provided, not feature-related limitations. Moreover, the device(s) generating tournament invitations and determining eligibility are also a question of incentive, and thus not feature-related limitations.

When participating in the tournament feature, the player operating the gaming machine plays a tournament play sequence resulting in the player obtaining a score. At the end of his participation, the score is recorded as a participation in the tournament feature with an identifier associating the player with that score.

A tournament play sequence in one embodiment is a series of plays of modified poker game. Upon initiation of the tournament play sequence, a preset number of plays of a three-hand poker game are played with a modified pay schedule. Modifications in the pay schedule are triggered during the tournament play sequence; the modifications improving the number of points awarded for particular outcomes. Another tournament play sequence involves a line game with specific point schedule, bonuses, and features allowing the player to obtain a score during its play. Another embodiment consists in a combination of games played in a predetermined order or according to a preset process, for instance the occurrence of a trigger event in a first game of the tournament play sequence initiating the play of a second game for the remaining part of the tournament play sequence.

Figure 6:
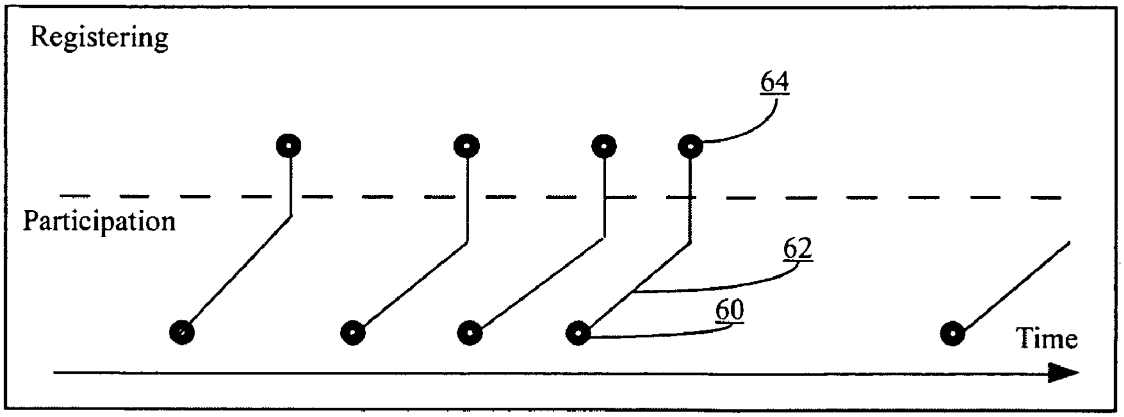
FIG. 6 is a time chart illustrating participations taking place in the tournament feature according to an embodiment.

In the present embodiment, participations continue taking place in the tournament feature up to the end of the tournament feature. Typically, players enter participations regardless of the fact that other players are already having participations taking place, are currently obtaining a score, or taking place into the tournament feature at the time. The process is seamless. FIG. 6 illustrates a timeline wherein tournament feature participations are illustrated for a network embodiment, including participation starting time 60, tournament play sequence 62, and the obtained score starting time 64.

Figures 7, 8:
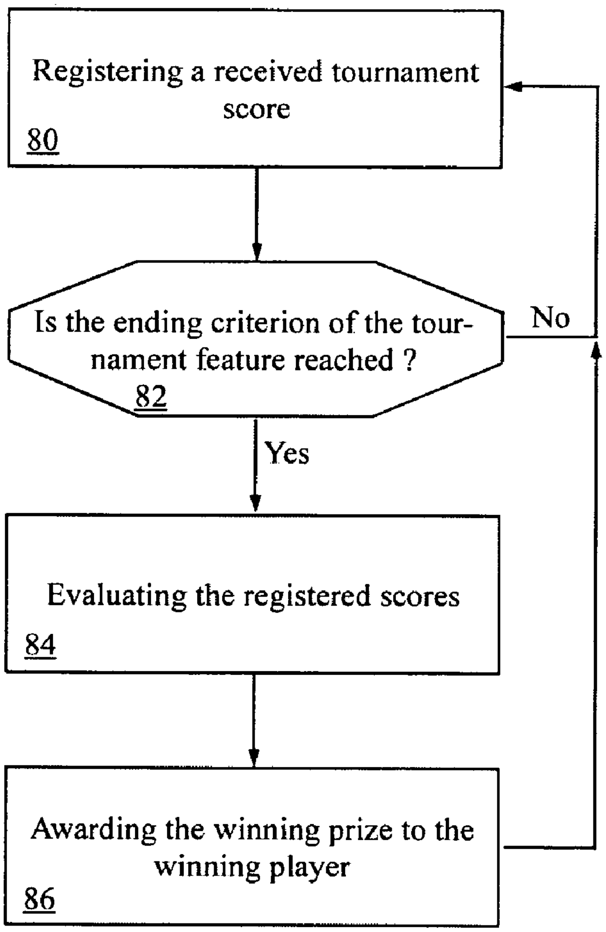
FIG. 7 is a schematic illustration of a suitable score register that is used in an embodiment of the tournament feature.
FIG. 8 is a flow chart illustrating steps performed by a tournament server in an embodiment of the tournament feature.

To associate a score to a player, many solutions exist, with the selection of one solution over another depending on a mix of available hardware and software, cost evaluation, security, and of the desired environment. Available solutions include association of information such as player input data (PIN for instance); of player biometric information; of hardware provided data (player card providing the identifier); or to generate the identifier and store it on a medium such as a smart card or a voucher provided to the player to list a few. The player identifying data is associated with the player score in the storing means that stores tournament data, thereby allowing, at the end of the tournament feature, to identify the player associated with a winning score with or without help of the player. However, for instance when the score is the last one of the tournament feature, or when the player remains on the gaming machine, no identifier may be stored or the identifier may be stored later. FIG. 7 illustrates an example of a tournament score register in which player identifications are associated with scores.

FIG. 8 illustrates the steps performed by the tournament feature in the present embodiment. As the tournament feature is conducted, the tournament server receives and stores scores (step 80). Upon detection of the end of the tournament feature (step 82), evaluation of the stored scores for determination of at least one winning score is performed (step 84); and an award is available to the player who entered a winning score (step 86). Depending on the method used to identify the player to the winning score, it can be necessary for a winning player to monitor tournament outcomes to claim the prize or rather the tournament providing authority may contact the winning player.

The end of the tournament feature may depend on different set factors. For instance, a tournament feature may have a preset duration, a preset number of participations, or a preset or random-based criterion regarding one or a combination of tournament features and/or primary-game based data including the above listed factors.

In another embodiment, invitations and eligibility are monitored in order to provide participations in the tournament feature. In a primary game, a play is performed. Monitoring regarding participation eligibility and invitation statuses is performed. Upon allowing the gaming machine to provide a participation in the tournament feature (for instance by having received an invitation when in a eligible state), an invitation is prompted on the gaming machine screen for the player to participate in the tournament feature, followed with the player playing a tournament play sequence (for free in the present embodiment) through which a tournament score is obtained. At the end of the tournament participation, the score is identified to the player and stored in a tournament register in the appropriate storing means.

In a networked embodiment, the tournament feature is initiated by the tournament server signaling gaming machines to offer participations in the tournament feature. Continuously, tournament ending criterion is monitored while obtained scores are stored in the tournament register as players participate in the tournament feature. When the tournament ending criterion is fulfilled, no more entry can take place in the tournament feature. Then, evaluation of the stored scores is performed, with at least one winner being determined. Finally, each winner is provided with their prize.

The latter embodiment and other embodiments may include further steps as verifying if tournament participations are in process when the ending criterion is fulfilled, and waiting for the scores associated with these participations to be stored to elect a tournament winner. It may further include signaling tournament winning information to gaming machines offering participation in the tournament feature, or on a distinct means for displaying tournament information to be seen by tournament-feature participating and non-participating persons. Another addition may be to prevent initiation of a new tournament feature until a certain criterion is fulfilled, such as all participation scores being received for the present tournament feature.

Another embodiment is a network of gaming machines on which a standard poker game is available for playing. On each gaming machine a monitoring is continuously performed to set eligibility of the gaming machine to provide a participation in the tournament feature, with the result being transmitted to the tournament server. A tournament server communicatively linked to the gaming machines sends, once in a while, a tournament invitation to a randomly elected eligible gaming machine. Accordingly, the player is invited to play a modified poker game (for instance with a modified pay table yielding score points for free). The player plays a maximum of N rounds with P betting points available at the beginning of these rounds with possibility to bet the points won during already played rounds into the next rounds of the tournament game sequence. The player may have limited time to complete the sequence. The player's score is the numbers of points the player has at the end of the play sequence. When the participation is complete, the gaming machine may prompt the player to enter identification, and may send a PIN back the player or a voucher that the player may use to certify his identity in case he wins the tournament feature. The tournament server stores tournament scores until the end of the tournament feature. When the tournament feature ends, the tournament server elects the player who has the best score as the winner. The winner is either contacted or published, the latter requiring the winner to verify himself his status after the end of the tournament feature in order to receive his prize. In the last case, a player identifying himself as the winner contacts the tournament providing authority to be provided his prize.

Based on the last embodiment, available variants include processing all participations in the tournament feature regardless of player participation level (i.e. bet level) in the primary game, the triggering event resulting in the participation, etc. Another variant involves storing the participations in different groups based on such criteria. For example, players playing the primary game at a play level A when invited to participate in the tournament feature would result in the score being stored in a register A, while a player playing at a participation level B would see his score obtained being stored in a register B. Therefore, the latter would result in distinct tournament features having similar characteristics or not.

In an embodiment, the tournament server provides tournament participation invitations without knowing the eligibility status of the signaled gaming machine. In another embodiment, the gaming machines continuously provide either their eligibility status or data to determine their eligibility status to the tournament server, and the tournament server signals tournament participation invitations only to eligible gaming machines.

Depending on the desired results, criteria used to set eligibility of a gaming machine may be based on the player being identified, either through means such a smart card or machine inserted VIP card, or a manually entered identification such a PIN. It may also be based on the play level on the gamine machine, for instance the amount of the last bet placed, the number of plays initiated during a monitoring period (e.g., during the last 5 minutes), the frequency of play initiations (e.g., an average of less than ten seconds between the last four play initiations), or even the time of the last play initiation (e.g. within the last twenty seconds).

In other embodiments, one, two, or more winners may be elected at the end of a tournament feature. Each winner may be awarded a different prize value. Accordingly, a different incentive is created. An example is electing three best scores to be awarded prizes; these players being accordingly awarded 60%, 30% and 10% of a total tournament prize in respect with their score order. Another example is to reward players who obtained extreme scores (highest and lowest). The value of these prizes may be predetermined or may be one or a portion of a progressive prize either or not dedicated to the tournament feature.

In another embodiment, a player participating in the tournament feature may be awarded instant prizes. Accordingly, the value of these prizes and the criteria used to determine if a player is awarded such a prize is a question of incentive and of payout control. For instance, in one such embodiment, the nth player being provided participation in the tournament feature may be awarded a prize based on the score he obtained; the instant prize being awarded as soon as the participation ends. In another embodiment, it may be associated with the first player obtaining a score over a preset threshold.

The value of the prize awarded may be preset, may be taken from a pool dedicated to the tournament feature, or may be taken from a pool shared with another feature such as a random-based progressive jackpot. For instance, the tournament feature winner could be awarded a percentage of the value of a progressive jackpot at the time the tournament feature ends or at the time the winning score was stored.

In one embodiment, a tournament score may depend only on a number of accumulated points the player scored throughout the outcomes obtained during the tournament game sequence. In other embodiments, the score may also depend on the time necessary to complete the tournament game sequence, a play or point betting sequence, or point evolution during the play of the rounds. Example of the latter is to increase scoring weight of the points won as the tournament participation advances; the points won gradually increasing their weight in the score from one time to two times their nominal values. Another is a tournament play sequence with a goal to reach, the score obtained depending on the goal being reached or not, the different intermediary states that were achieved, and the time that was necessary to reach the goal and the intermediary states. Therefore, the variety of games and methods to score points is solely limited by the objective of obtaining a score. Thus, these examples are provided for teaching purposes only.

In different embodiments, the end of a tournament feature may be differently set. As stated earlier, in one embodiment, time or feature duration may be used to determine the end of the tournament feature. In another embodiment, the number of participations may be used to set when the tournament feature ends. In another one, a tallied total score is used to set the tournament feature ending criteria. In these embodiments, these criteria may be predetermined or may depend on random determination setting. Furthermore, the winning prize in these embodiments may also be predetermined or differently set. For instance, it may rather depend on the number of tournament feature participations or on the period the tournament feature lasts. Consequently, any game-related and tournament-related data alone or in combination, randomly set and preset, may be used to determine when the tournament feature ends and/or the winning prize value(s) according to the scope of the invention. Furthermore, the prize awarded to a tournament feature winner may also take different formats such as participation rights to a special feature or event, comps, gifts, etc.

In an embodiment in which at least one gaming machine does not provide players with possibility to autonomously associate a personal identifier (such as a PIN or smartcard-provided data) with their scores, or when anonymous tournament feature participation is available, players may receive a voucher each time they participate in the tournament feature. The voucher bears a unique identifier that may be compared to winner identifier(s) at the end of the tournament. If the voucher identifier matches one winner identifier, the player may claim a prize.

In another embodiment, eligibility is not set at the same level for all players. Accordingly, depending on the bet level of the player, data associated with the player and provided by a player tracking system, game played, conditions in which the tournament feature participation is offered to the player, etc., an eligibility level will be set. Depending on this eligibility level, the player would see a handicap being assigned to his participation in the tournament feature; this handicap influencing the present tournament feature participation process.

Once again, the kind of handicap selected depends more on the desired feature than on feature associated limitations. Examples of applicable handicaps include, tournament play time, tournament initial state settings, game process settings, and score obtaining process settings. These are provided for teaching purposes only.

Another variant of the latter embodiment is to modify the score obtained with a modifying value according to the state in which the initiation of the tournament participation takes place. Accordingly, a participation resulting from an invitation would store an unmodified obtained score while a participation resulting from another situation could be applied a modifying value stored in a stored score that would differ from the score obtained.

Another embodiment consists in an asynchronous tournament feature as described previously in which time is set as the handicap assigned to tournament feature participations. In this embodiment, players participating in the tournament feature are assigned a handicap (i.e., a time), with this handicap depending on participation initiation state, namely the game they were playing, their bet level, and the outcome that triggered generation of the invitation. Accordingly, the player has more or less time to play the tournament game sequence.

In another embodiment, players may either be invited or may manually request participation in the tournament feature. In response to such a manual request, the gaming machine requests an entry fee, and provides tournament participation to the player. For their part, invitation-based participations are fee free. At the end of the tournament feature, tournament feature participations, regardless of having been performed on invitation or not, are compared to elect a winner. In this embodiment, participations are assigned a different handicap depending on whether or not they are performed on invitation. This handicap as stated above may take many forms: a different pay table, enabled/disabled bonuses, different participation duration, different initial points, different point weighting, etc.; or a combination of the above.

Furthermore, in the last embodiment, when identification of participants is required before the initiation of participation, the handicap assigned to a fee-based participant may be based on player identification or may evolve as one participant increases his number of participations.

Another embodiment is a synchronous tournament feature wherein all participants concurrently participate. Thus the winner(s) is known as soon as the tournament feature ends. In this embodiment, players participating in the tournament feature are assigned a handicap with this handicap depending on participation request-related data and/or player identification-related data. For instance, the time to complete the tournament game sequence could vary from one tournament feature participant to another depending on the fee paid to participate in said tournament feature or on invitation being stored for a particular participation.

Figure 9:
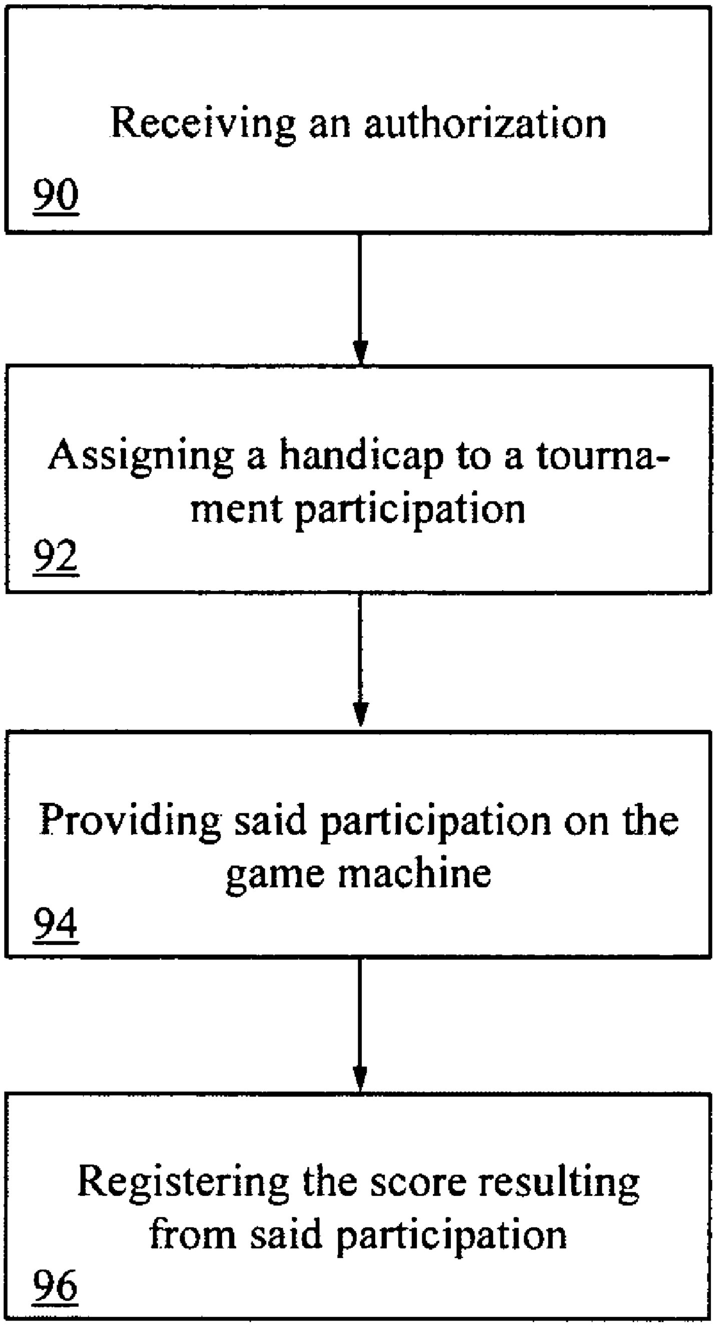
FIG. 9 is a flow chart illustrating steps performed by a game machine in an embodiment of the tournament feature wherein handicaps are assigned to participations in said tournament feature.

FIG. 9 illustrates the latter embodiment, with the method comprising receiving an authorization to participate in the tournament feature on a game machine (step 90); assigning a handicap to a participation (step 92); providing said participation to the player (step 94) through which a score is obtained; and storing the score in a storing means (step 96) with other tournament scores, wherein a winning score may be determined based on the scores stored.

In the latter embodiment, players may participate on game machines dedicated to the tournament feature. For instance, a voucher may be provided to players. They can enter the voucher in the game machine to participate in the tournament feature; the machines responding to it with the conduct of a tournament play sequence on all participating game machines at the same time. In this embodiment, each one of the tournament participations is assigned a handicap. The handicap is transmitted to the game machine through one of a network signal or the voucher. Accordingly, the game machines may either be dedicated to the tournament feature or may be available when not providing tournament participations to play an amusement game for instance.

In such an embodiment, the tournament server may also provide the game machine with data on which will be based on the tournament play sequence. For instance, the tournament server may signal data to each game machine with said data identifying the order of some features potentially occurring during the conduct of the tournament play sequence, or rules to conduct the tournament play sequence.

Other embodiments of synchronous tournament features are available embodying the different features, criteria, variants, etc. that have been disclosed in the present document are possible. For instance, a tournament feature wherein players accumulate tournament feature invitations when playing a primary game with the tournament feature being forecast to start at a preset time. According to the primary game in which the player received the invitation, the participation level when the player received his participation, the number of invitations received, etc. each participation would be assigned a handicap that would influence the associated tournament play sequence, and potentially the score obtained. Furthermore, a player may or may not buy participations in the synchronous tournament feature, the assigned handicap varying for instance according to the buying fee and the moment the participation was bought.

In another embodiment, only fee-based tournament participations may be available. Furthermore, participants may select different participation fees for their participations. According to players' selected fees, different handicaps are assigned to participations in the same tournament feature. Accordingly, depending on strategy, or on desired incentive, players may take different decisions.

In another embodiment, supplementary data is affixed to the participation in addition to identifier, with the affixed data being used to determine the winning value to award to the winner. An example of this embodiment is that the handicap assigned to a participation being stored in combination with the score obtained. When determining the winner, the scores are compared regardless of the handicap experienced by the player when obtaining the score. However, when determining the prize to award to the winner, the handicap is taken into consideration. Therefore, the prize value would potentially vary depending on the handicap from, for instance, a maximum prize to a portion of said maximum prize.

Furthermore, in an embodiment an individual monitoring of participants and modification of the assigned handicap as their number of participations increase may be performed. The handicap modification may also depend on the last scores, for instance to correct unfair advantage a player may have when he experiences the tournament play sequence many times.

Regardless of the embodiments, displaying tournament feature information is possible. Such information may comprise individual participant scores, best scores, tournament lasting information, prizes, rules, special features related to the tournament feature, etc. This information may be available on the gaming machines, or other displaying means as deemed appropriate.

Those skilled in the art may recognize other embodiments and/or methods to provide such functionalities, either through a central distribution of play data to networked gaming machines, a computer program adapted for such an application and performing said application on computers, or program codes broadcasted using a suitable carrier or saved in memory or another storing medium. The program codes are suitable or responsible, when loaded on a computer or a gaming machine, for making the apparatus perform functionalities of the present invention. However, all of such alternatives are intended to be incorporated in the present document through the herein reference.

It will be noted that the above embodiments illustrate different characteristics the current invention may present. Those skilled in the art will recognize that, even if the embodiments of the present document describe these characteristics as part of different embodiments, one could differently use or combine some of these characteristics without departing from the scope of the invention as intended to be set. Furthermore, embodiments may also present other characteristics and/or variations, with such characteristics falling within the scope of the invention, as set forth in the appended claims.

Furthermore, while some of the appended figures illustrate the invention as groups of discrete components, it will be understood by those skilled in the art that the invention may be embodied differently, for instance through a combination of hardware and software components with some components being implemented by a given function or operation of a hardware or software system. The structure illustrated is thus provided for efficiency of teaching embodiments of the invention.

Thereupon, it is the intent through the present document to efficiently teach the invention through embodiments, while the scope of the invention is solely intended to be limited by the appended claims.

The invention claimed is:

1. A method of providing a tournament feature allowing asynchronous tournament participations in which, upon or after ending of a participation period in said tournament feature, scores resulting from said tournament participations that took place during said participation period are evaluated to determine a winning score for awarding a prize to a winning player, the method comprising:

conducting a primary game on a gaming machine in which game outcomes are generated and evaluated and wherein a prize is awarded for a winning outcome;

detecting a tournament participation invitation during said step of conducting said primary game, said step of detecting a tournament participation invitation taking place during said participation period; and providing at least one of said tournament participations during said participation period according to completion of said step of detecting said tournament participation invitation, each said tournament participation comprising conduct of a tournament play sequence resulting in at least one of said scores in said tournament feature, wherein said at least one tournament participation is provided during said participation period in a non-concurrent manner with respect to at least another tournament participation provided during the same participation period resulting in at least another of said scores in the same tournament feature.

2. The method of claim 1, further comprising communicating at least one of the scores to a communicatively linked tournament server on which are stored said scores.

3. The method of claim 2, further comprising receiving said tournament participation invitation from said tournament server.

4. The method of claim 2, further comprising communicating to said tournament server at least one of game data; activity monitored on a gaming machine providing said primary game; and player-related data.

5. The method of claim 1, further comprising receiving a manually provided medium bearing information reflective of said tournament participation invitation.

6. The method of claim 1, further comprising monitoring occurrence of game outcomes; and upon occurrence of a specific outcome among said monitored game outcomes, generating a tournament participation invitation.

7. The method of claim 1, further comprising generating said tournament participation invitation regardless of occurrence of a specific game outcome.

8. The method of claim 1, further comprising determining an eligibility state, wherein determination of a positive eligibility state is necessary for said detection of a tournament participation invitation to result in providing at least one of said tournament participations.

9. The method of claim 8, wherein said determination of an eligibility state is performed based on at least one of: game data; activity monitored on a gaming machine providing said primary game; and player-related data.

10. The method of claim 8, further comprising receiving from a communicatively linked tournament server a signal identifying one of: one said eligibility state and one said tournament participation invitation.

11. The method of claim 8, wherein said tournament play sequence is provided for free upon said detection of at least one of said tournament participation invitations.

12. The method of claim 1, further comprising:

receiving a tournament participation request from a requesting player;

receiving a tournament participation fee associated with said tournament participation request; and providing said requesting player with one said tournament participation.

13. The method of claim 12, further comprising determining an eligibility state, wherein receiving a tournament participation request is available upon positive determination of one said eligibility state.

14. The method of claim 1, further comprising assigning at least one of: a handicap to said tournament participation resulting from said tournament participation request; and a value modifying the marked score resulting from said tournament participation request.

15. The method of claim 14, wherein the assigned handicap or modifying value is determined based on at least one of: game data; data depending on activity monitored on a gaming machine providing said primary game; player-related data; and process depending on which one said tournament participation is provided.

16. The method of claim 14, wherein said handicap influences at least one of:

an initial state for the conduct of said tournament play sequence; the conduct of said tournament play sequence, and process used to mark said score during the conduct of said tournament play sequence.

17. The method of claim 1, further comprising determining said score based on at least one of: results obtained during the conduct of said tournament play sequence; and the conduct of said tournament play sequence.

18. The method of claim 1, further comprising associating an identifier with said score through at least one of:

generating said identifier and providing said identifier to the player in at least one of an informal format and a medium-borne format;

receiving electronic data either associated with said player or from said player, with determination of said identifier being based on said received data; and receiving biometric data from said player, with determination of said identifier being based on said biometric data.

19. The method of claim 1, further comprising awarding an instant prize based on said tournament participation.

20. The method of claim 1, wherein at least one of the primary game and the tournament game comprises one of: poker; blackjack; keno; bingo; line game; strategy game; and skill game.

21. The method of claim 1, wherein, upon said tournament play sequence ending, said primary game may be conducted.

22. The method of claim 1, wherein upon detection of a tournament participation invitation during the conduct of said primary game, the method further comprising:

completing the conduct of the primary game; and initiating said step of providing at least one of said tournament participation upon completion of said conduct of the primary game.

23. A gaming machine for providing a tournament feature allowing asynchronous tournament participations in which, upon or after ending of a participation period in said tournament feature, scores resulting from said tournament participations that took place during said participation period are evaluated to determine a winning score for awarding a prize to a winning player, the method comprising:

displaying means for displaying game contents;

accepting means for accepting credit information;

inputting means for a player inputting commands;

awarding means for awarding prizes;

storing means for storing game data according to processes relating at least to said scores; and controlling means configured to:

conduct of a primary game in which, after credit information being accepted and a player having input one said command, a primary game is conducted with said game contents being displayed and one of said prizes being awarded for a winning outcome, and conduct of one said tournament participation upon detection of a tournament participation invitation during conduct of said primary game during said participation period, said conduct of one said tournament participation comprising conduct of a tournament play sequence during said participation period resulting in at least one of said tournament scores, wherein said tournament participation is conducted during said participation period in a non-concurrent manner with respect to at least another tournament participation conducted during the same participation period resulting in another of said tournament scores in the same tournament feature.

24. The gaming machine of claim 23, further comprising identifying means identifying said tournament score with an identifier allowing determination of the player who obtained said score once stored.

25. The gaming machine of claim 23, further comprising communicating means for at least one of communicating to and receiving from at least one device involved in providing tournament-feature related data to said tournament feature.

26. The gaming machine of claim 23, further comprising receiving means for receiving from a player a medium bearing information reflective of one said tournament participation.

27. The gaming machine of claim 23, wherein said controlling means is further adapted to:

detect completion of a play of said primary game during which said tournament participation invitation is detected; and initiating conduct of said tournament participation upon said detection of completion of said play.

28. A method of providing a tournament feature allowing asynchronous tournament participations in which, upon or after ending of a participation period in said tournament feature, scores resulting from said tournament participations that took place during said participation period are evaluated to determine a winning score for a winning player to be awarded a tournament prize, comprising:

storing scores obtained on a player-operated gaming machine on which is conducted a primary game generating primary-game outcomes and awarding primary-game prizes to a player, and on which after a tournament participation invitation being detected during conduct of said primary game during said participation period at least one of said tournament participations is performed during said participation period each comprising (a) conducting of a tournament play sequence, (b) tallying of one score according to said tournament play sequence, and (c) storing of said score resulting from said tournament participation; and upon or after determination of the end of said participation period of said tournament feature, evaluating the stored scores to determine a winning score according to which the player who obtained said winning score is awarded said tournament prize, wherein said tournament participation performed during said participation period is provided in a non-concurrent manner with respect to at least another of said tournament participations performed during the same participation period.

29. The method of claim 28, further comprising receiving said scores from said gaming machine.

30. The method of claim 28, further comprising identifying said scores with an identifier.

31. The method of claim 28, further comprising generating a tournament participation invitation and communicating said tournament participation invitation to said gaming machine, wherein detection of said tournament invitation on said one gaming machine initiates one said tournament participation on said gaming machine.

32. The method of claim 28, further comprising monitoring activity on said gaming machine, and determining at least one of a) tournament participation invitation and b) tournament eligibility, based on said activity monitoring.

33. The method of claim 32, wherein said detection of said tournament participation invitation and said determination of said tournament eligibility are necessary to be concurrent to initiate said tournament participation on said gaming machine.

34. The method of claim 28, further comprising:

receiving a tournament participation request from a requesting player;

receiving a tournament participation fee from said requesting player; and signaling said gaming machine to permit said requesting player to initiate said tournament participation on said gaming machine.

35. The method of claim 34, further comprising assigning at least one of a handicap and a modifying value to said tournament participation resulting form said tournament participation request.

36. The method of claim 28, further comprising determining when said tournament feature ends based on either individual or cumulative activity monitored on said gaming machine or on a plurality of gaming machines.

37. The method of claim 36, wherein said activity monitoring is based on at least one of: activity taking place out of the conduct of said tournament play sequence; the conduct of said tournament play sequence; and cumulative activity related to said tournament feature.

38. The method of claim 28, wherein said gaming machine is adapted to conduct a primary game when not conducting a tournament play sequence.

39. The method of claim 38, wherein conduct of at least one of said primary game and said tournament play sequence involves conduct of at least one of: poker; blackjack; keno; bingo; line game; strategy game; and skill game.

40. The method of claim 28, further comprising communicating at least part of data allowing said tournament participation on said gaming machine.

41. The method of claim 28, further comprising determining value of said prize based on at least one of: preset data; tournament feature participation data; and a feature different from said tournament feature, said different feature providing prize value data.

42. The method of claim 28, further comprising determining an instant prize to be awarded to said player based on one said tournament participation of said player.

43. The method of claim 28, further comprising communicating tournament-feature related information to communicatively linked device, said device displaying said tournament-feature related information.

44. A tournament server providing a tournament feature allowing asynchronous participations in which, upon or after ending of a participation period in said tournament feature, scores resulting from said tournament participations that took place during said participation period are evaluated to determine a winning score for awarding a prize to a winning player, the tournament server, comprising:

communicating means for exchanging data with at least one player-operated gaming machine conducting a primary game generating primary-game outcomes and awarding primary-game prizes to player and allowing one said tournament participation to be provided during said participation period upon detection of one said tournament participation invitation during conduct of said primary game during said participation period, said data exchanged with said at least one player-operated gaming machine comprising scores obtained during a plurality of said tournament participations during said participation period;

storing means for storing said scores obtained during said participation period in said tournament feature; and controlling means configured to conduct said tournament feature, comprising controlling (a) a process for storing said scores; (b) a process for determining when the participation period in said tournament feature ends; and (c) a process for evaluating scores stored during the participation period to determine a tournament feature winning score, with the player who obtained said winning score being awarded said tournament prize, wherein said tournament participation is provided during said participation period in a non-concurrent manner with respect to at least another tournament participation provided during the same participation period.

45. The tournament server of claim 44, further comprising identifying means identifying scores with identifiers.

46. The tournament server of claim 44, further comprising monitoring means for monitoring activity on said gaming machine with said controlling means further generating and communicating at least one of said tournament participation invitation and tournament eligibility on one said gaming machine is necessary for providing said tournament participation.

47. The tournament server of claim 44, further comprising second communicating means exchanging data with a device responsible for a feature different from said tournament feature, with said second controlling means further determining value of said tournament prize based on said data exchanged.

48. A method of providing a tournament feature allowing asynchronous tournament participations in which, upon or after ending of a participation period in said tournament feature, scores resulting from said tournament participations that took place during said participation period are evaluated to determine a winning score for a winning player to be awarded a tournament prize, the method comprising:

conducting a primary game on at least one player-operated gaming machine during which game outcomes are generated and evaluated and wherein a prize is awarded for a winning outcome;

monitoring activity of said at least one player-operated gaming machine in relation with said step of conducting said primary game;

generating tournament participation invitations detectable by said at least one gaming machine during said participation period based on said activity monitoring;

detecting at least one of said tournament participation invitations generated based on said activity monitoring on one of said at least one gaming machine;

providing said tournament participation on said gaming machine during said participation period according to completion of said step of detecting at least one of said tournament participation invitations, comprising conduct of a tournament play sequence depending on which a tournament score is obtained;

storing said score resulting from said tournament participation with a plurality of scores during said participation period in said tournament feature;

upon or after detection of the end of said participation period, evaluating said stored scores to determine a winning score and a winning player who obtained said winning score; and awarding said tournament prize to said winning player, wherein said tournament participation is provided during said participation period in a non-concurrent manner with respect to at least another tournament participation provided during the same participation period and resulting in another of said scores.

49. The method of claim 48, further comprising identifying each of said obtained scores with an identifier.

50. The method of claim 48, further comprising determining value of said tournament prize based on instant value provided by a feature different from said tournament feature.

51. The method of claim 48, further comprising determining tournament eligibility based on said activity monitoring.

52. The method of claim 51, wherein at least one of said generation of a tournament participation invitation and said determination of a tournament eligibility is performed regardless of occurrence of a specific outcome in at least said primary game.

53. The method of claim 48, further comprising receiving credit information and tournament participation request from a requesting player, resulting in at least one of generation of one said tournament participation invitation, and a positive determination of tournament eligibility being performed.

54. The method of claim 48, further comprising:

detecting completion of a play of said primary game during which said tournament participation invitation is detected; and initiating conduct of said tournament participation upon said detection of completion of said play.

55. A non-transitory computer readable storage medium, adapted to provide a tournament feature allowing asynchronous tournament participations in which, upon or after ending of a participation period in said tournament feature, scores resulting from said tournament participations that took place during said participation period are evaluated to determine a winning score for awarding a prize to a winning player, said computer codes being adapted to at least one of:

a) conducting a primary game in which game outcomes are generated and evaluated and wherein a prize is awarded for a winning outcome;

detecting a tournament participation invitation during said conducting of a primary game; and providing at least one of said tournament participations during said participation period according to completion of said detecting of a tournament participation, comprising conduct of a tournament play sequence depending on which one said score participating in said tournament feature is obtained, wherein said tournament participation is provided during said participation period in a non-concurrent manner with respect to at least another tournament participation provided during the same participation period in said tournament feature, b) storing a plurality of scores obtained on at least one player-operated gaming machine conducting one said primary game, each said score being obtained during one said tournament participation provided during said participation period and being provided upon detection of a tournament participation invitation on said gaming machine, wherein each said tournament participation comprises (i) conducting a tournament play sequence, (ii) tallying a score throughout said tournament play sequence and (iii) establishing a tournament participation score according to said tallied score when said tournament play sequence is completed; and upon or after determination of an end of said participation period, evaluating the stored scores to determine a winning score according to which the player who obtained said winning score is awarded said tournament prize, wherein said tournament participation is provided during said participation period in a non-concurrent manner with respect to another tournament participation provided during the same participation period and participating in the same tournament feature, and c) generating a tournament participation invitation based on monitored activity related to said primary game on said at least one gaming machine providing said primary game with detection of said tournament participation invitation by one of said at least one game machine resulting in said tournament participation being provided during said participation period on said gaming machine, wherein said tournament participation is provided during said participation period in a non-concurrent manner with respect to another tournament participation provided during the same participation period and depending on another tournament participation invitation, and wherein upon or after an end of the participation period in said tournament feature, scores resulting from said tournament participation provided during said participation period and said another tournament participation provided during the same participation period are evaluated to determine a winning score.

* * * * *